(12) United States Patent
Sunkada

(10) Patent No.: US 9,953,356 B2
(45) Date of Patent: *Apr. 24, 2018

(54) IMAGE-BASED PRODUCT MARKETING SYSTEMS AND METHODS

(71) Applicant: Verizon Patent and Licensing Inc., Arlington, VA (US)

(72) Inventor: Gururaj Sunkada, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 722 days.

This patent is subject to a terminal disclaimer.

(21) Appl. No.: 14/093,443

(22) Filed: Nov. 30, 2013

(65) Prior Publication Data

US 2014/0089145 A1    Mar. 27, 2014

Related U.S. Application Data

(63) Continuation of application No. 12/768,997, filed on Apr. 28, 2010, now Pat. No. 8,600,824.

(51) Int. Cl.
*G06Q 30/00* (2012.01)
*G06Q 30/06* (2012.01)
*G06F 17/30* (2006.01)
*G06Q 10/00* (2012.01)
*G06Q 30/02* (2012.01)

(52) U.S. Cl.
CPC ... *G06Q 30/0627* (2013.01); *G06F 17/30247* (2013.01); *G06F 17/30864* (2013.01); *G06Q 10/00* (2013.01); *G06Q 30/00* (2013.01); *G06Q 30/02* (2013.01); *G06Q 30/0601* (2013.01); *G06Q 30/0643* (2013.01)

(58) Field of Classification Search
CPC .................... G06Q 30/60; G06F 17/30247
USPC ..................................................... 705/26, 27
See application file for complete search history.

(56) References Cited

U.S. PATENT DOCUMENTS

| 7,027,652 | B1 * | 4/2006 | I'Anson .................. 382/218 |
| 7,069,238 | B2 * | 6/2006 | I'Anson et al. .......... 705/26.64 |
| 7,574,381 | B1 * | 8/2009 | Lin-Hendel ................ 705/26.9 |
| 7,734,729 | B2 * | 6/2010 | Du et al. .................... 709/219 |
| 7,751,805 | B2 * | 7/2010 | Neven et al. ............ 455/414.3 |
| 2003/0167264 | A1 | 9/2003 | Ogura et al. |
| 2006/0240862 | A1 * | 10/2006 | Neven et al. ............ 455/550.1 |
| 2007/0208631 | A1 * | 9/2007 | Jung et al. ................... 705/26 |
| 2008/0249898 | A1 | 10/2008 | Ratnakar |
| 2011/0106721 | A1 | 5/2011 | Nickerson et al. |

OTHER PUBLICATIONS

Neven Vision: Internet Archive Wayback Machine, www.archive.org; nevenvision.com, Dec. 2005-Feb. 2006; 11 pgs.*

* cited by examiner

*Primary Examiner* — Robert M Pond

(57) ABSTRACT

An exemplary method includes a product marketing system receiving, from an access device, a product search request and image data representative of an image associated with a product, searching, in response to the product search request, a repository of product image data to identify at least one match to the image associated with the product, generating, based on the at least one match, search results data comprising product information for at least one product, and transmitting the search results data to the access device. Corresponding systems and methods are also described.

19 Claims, 10 Drawing Sheets

IMAGE-BASED PRODUCT MARKETING SYSTEMS AND METHODS

RELATED APPLICATIONS

This application is a continuation application of U.S. patent application Ser. No. 12/768,997, filed Apr. 28, 2010, and entitled IMAGE-BASED PRODUCT MARKETING SYSTEMS AND METHODS, which is hereby incorporated by reference in its entirety.

BACKGROUND INFORMATION

Advancements in communication technologies have changed the way that many consumers shop for and purchase products and services. For example, a consumer who is interested in a particular product may use the Internet to search for information and/or availability of the product. Using a computer, the consumer may browse to a particular website associated with an organization that sells the product, or the consumer may access an Internet search engine and initiate a keyword search for information about the product.

However, such shopping techniques are not well-suited for all consumers or situations. For example, a consumer may not be aware of a particular website to which to browse to access information about a product, or the consumer may not know or may not be able to readily think of keywords that will lead an Internet search engine to produce relevant and helpful results. To illustrate, a consumer may see a particular product in which she is interested but may not know enough about the product to effectively utilize conventional shopping techniques to locate information about the product.

In addition, a keyword search performed by a conventional Internet search engine may produce results that are undesirable to the consumer and/or a marketer of a product. For example, the results may include information that is not relevant or helpful to the consumer's interest in the product. The results may also include information that a marketer of the product would prefer that the consumer not see, such as incorrect or outdated information about the product or a different product.

For at least these reasons, marketers and/or consumers would benefit from improved and/or news tools for marketing products and services.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary product marketing systems and methods are described herein. The exemplary systems and methods may provide a product marketing and/or shopping platform having improved and/or new tools for marketing products or services, which tools may provide consumers with improved convenience and/or options for shopping for products or services. For instance, the exemplary products or services may provide an option to search for product information based on an image associated with a product (e.g., an image of a product). To illustrate, in certain examples, a consumer may come across a product. The consumer may utilize an access device having a camera to capture an image of a product (e.g., a photograph of a product) on the fly. The image of the product may be used to search a repository of product image data and to identify one or more product images that match the image of the product. One or more products associated with the matching product images may be identified and product information for the one or more products inserted in product search results data, which may be presented to the consumer for use by the consumer in shopping for the product.

As used herein, the term "consumer" may refer generally to any individual or organization that purchases or may potentially purchase or otherwise consume products and/or services. The term "marketer" as used herein may refer generally to any individual or organization that sells, markets, advertises, manufactures, distributes, or otherwise provides or promotes products and/or services for consumption and/or for further distribution. The term "product" as used hereinafter may refer generally to any product or service that may be consumed, purchased, or otherwise used by a consumer.

Exemplary embodiments of product marketing systems and methods will now be described with reference to the accompanying drawings.

Figure 1:
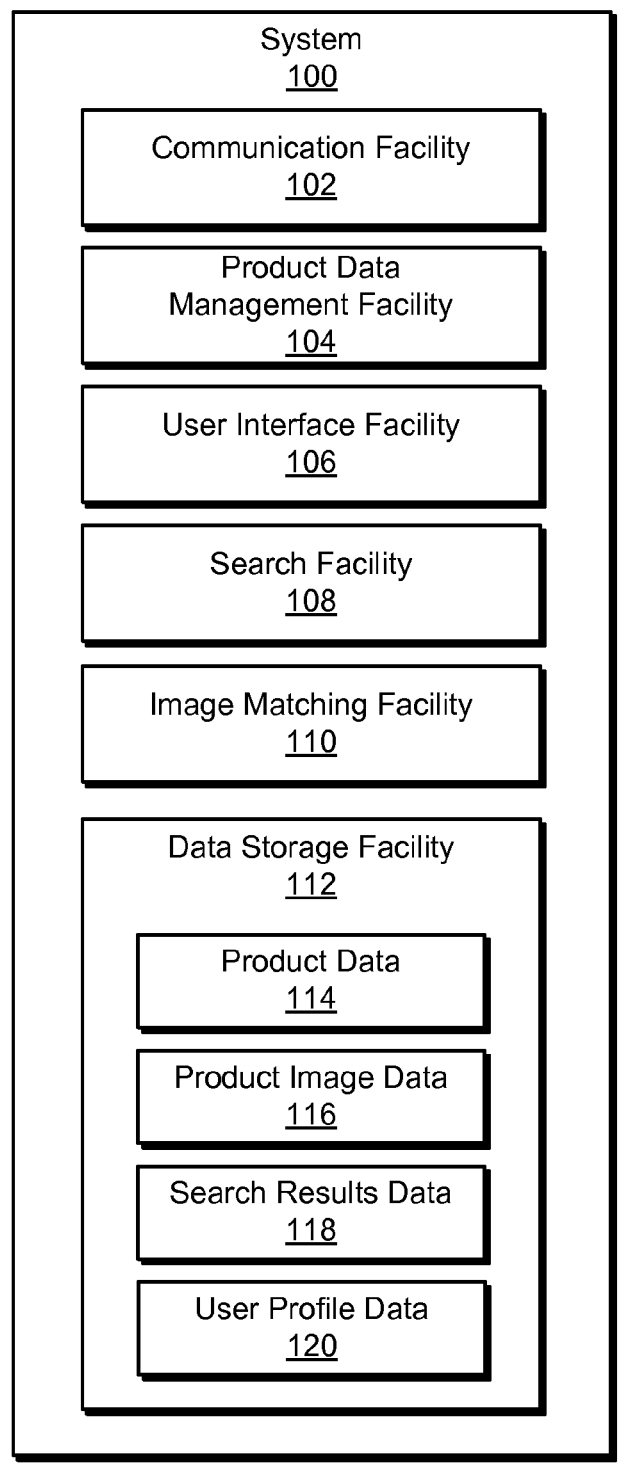
FIG. 1 illustrates an exemplary product marketing system according to principles described herein.

FIG. 1 illustrates an exemplary product marketing system 100 (or simply "system 100"). While an exemplary system 100 is shown in FIG. 1, the components and configuration of system 100 illustrated in FIG. 1 are not intended to be limiting. Additional or alternative components and/or configurations may be used in other embodiments. In certain alternative embodiments, for example, one or more of the components shown in FIG. 1 may be omitted or combined.

System 100 may include, but is not limited to, a communication facility 102, a product data management facility 104, a user interface facility 106, a search facility 108, an image matching facility 110, and a data storage facility 112 selectively and communicatively coupled one to another. Any suitable communication technologies, including any of the communication technologies mentioned herein, may be employed to facilitate communications between facilities 102-112.

Communication facility 102 may be configured to communicate with one or more computing devices. For example, communication facility 102 may be configured to transmit and/or receive communication signals and/or data to/from a user access device. Examples of communication facility 102 include, without limitation, a wired network interface (such as a network interface card), a wireless network interface (such as a wireless network interface card), a modem, an optical fiber network terminal, and any other suitable interface.

Additionally or alternatively, communication facility 102 may be configured to facilitate communications between one or more of the facilities 104-112 shown in FIG. 1 and/or with one or more applications executing on a computing device. For example, communication facility 102 may include one or more application program interfaces configured to allow system 100 to interface with one or more applications executing on a computing device. To illustrate, a computing device may include an image capture application associated with a camera, and communication facility 102 may facilitate communications between system 100 and the image capture application, including receiving image data representative of a captured image (e.g., a photo) from the image capture application.

Product data management facility 104 may be configured to receive, store, aggregate, organize, maintain, and/or otherwise manage product data. Product data may include any data representative of or otherwise associated with one or more products. For example, product data may include, without limitation, product identifiers (e.g., product names, models, serial numbers, etc.), product descriptions, product reviews, product ratings, product vendor information, hyperlinks to vendor websites, product image data representative of one or more images of and/or associated with a product, product availability information, product promotional information (e.g., products deals, offers, discounts, price comparisons, coupons, and advertisements), product metadata, and/or any other information related to a product and/or product vendor. The product data may be stored in a repository of product data within data storage facility 112 as product data 114. The repository of product data may include a repository of product image data stored within data storage facility 112 as product image data 116. As described in more detail further below, in some examples, product data management facility 104 may be configured to receive product data associated with one or more products from one or more sources of product data, such as marketers and/or access devices associated with marketers, and aggregate and store the received product data in a repository of product data within data storage facility 112.

The repository of product data may be dynamic, meaning that marketers may be able to dynamically provide and manage (e.g., update) the product data in the repository. Accordingly, the product data may subject to captive control by the marketers and may include product information that the marketers wish to be presented to consumers.

User interface facility 106 may be configured to provide one or more user interfaces configured to facilitate user interaction with system 100. For example, user interface facility 106 may provide a user interface through which one or more functions, options, features, and/or tools may be provided to a user and through which user input may be received. In certain embodiments, user interface facility 106 may be configured to provide one or more product data management tools in a user interface (i.e., a marketer interface) for use by a marketer and one or more product search and/or shopping tools in a user interface (i.e., a consumer interface) for use by a consumer. Accordingly, through one or more user interfaces provided by user interface facility 106, system 100 may receive product data from one or more marketers and/or product search requests and associated search parameters (e.g., image data representative of a product image, keyword data, product category data, geographic location data, etc.) from one or more consumers. System 100 may also provide product search results data to a consumer by way of a user interface. Exemplary graphical user interfaces that may be provided by user interface facility 106 are described in detail further below.

Search facility 108 may be configured to search a repository of product data maintained in data storage facility 112 by product data management facility 104 for one or more matches to search parameters associated with a product search request. The search may be based on search parameters including, without limitation, image data representative of an image associated with a product (e.g., an image of a product), keyword data representative of one or more keywords, product category data representative of a product category, location data representative of a geographic location or area, and any combination or sub-combination thereof. Search facility 108 may be configured to search product data in accordance with a search heuristic, which may define one or more conditions to be satisfied in order for a match to be determined to exist. The search heuristic may specify an order by which search parameters may be considered and used to search various fields (e.g., image and/or data fields) in the repository of product data. The search heuristic, including the match conditions and/or order of parameter searching specified therein, may be defined as may suit a particular implementation.

Search facility 108 may be further configured to generate search results data based on one or more matches identified by a search of product data. For example, when a match is located, search facility 108 may determine a product associated with the match, retrieve product information for the product, and insert the product information in search results data. The product information may be retrieved from product data in data storage facility 112 and/or from one or more external sources.

Search results data may include any information associated with one or more products determined to match search parameters specified by a search request. For example, search results data may include, without limitation, product information such as product identifiers (e.g., product names, models, serial numbers, etc.), product descriptions, product reviews, product ratings, product vendor information, hyperlinks (e.g., hyperlinks to vendor websites), product image data representative of one or more images of and/or associated with a product, product availability information, product promotional information, and/or any other information related to a product. The search results data may be stored in data storage facility 112 as search results data 118.

In certain embodiments, search facility 108 may be configured to invoke one or more operations of image matching facility 110 in conjunction with a product search that is based at least in part on an image associated with a product. Image matching facility 110 may be configured to analyze image data and determine from the analysis whether an image matches another image. Image matching facility 110 may perform the analysis and determine whether a match exists between images in accordance with an image matching heuristic, which may define one or more conditions of an image match. The image matching heuristic, including the match conditions specified therein, may be defined to facilitate detection of matching products represented in different images and as may suit a particular implementation.

Image matching facility 110 may employ any suitable image matching technologies to analyze images and determine whether the images match. For example, image matching facility 110 may analyze pixel attributes (e.g., color, brightness, saturation, etc.), patterns of pixel attributes, and any other image data to identify product characteristics within images (e.g., product shapes, logos, etc.). Identified product characteristics may then be compared between images and used to determine whether product characteristics are shared between the images. If a minimum threshold of commonality exists, as defined by the image matching heuristic, image matching facility 110 may determine that the images match.

In certain embodiments, image matching facility 110 may be configured to convert image formats. For example, image matching facility 110 may be configured to convert an image to a particular format to be used to compare the image to one or more other images. The conversion may be configured so as to take into account variations that may exist between images and/or image formats, such as varying sizes and pixel configurations. Various image formats (e.g., JPEG, GIF, BMP, etc.) may be converted or otherwise supported in certain examples.

To facilitate opportunities for image matches to be discovered, a marketer may provide one or more images associated with a product and that are configured to represent various views of the product. For example, product image data 116 may represent a full three-dimensional view of the product by way of a three-hundred-sixty-degree view of the product or by multiple images representing multiple views of the product from various viewpoints (e.g., side views, front view, back view, top view, bottom view, and/or perspective views).

Data storage facility 112 may be configured to maintain product data 114, product image data 116, search results data 118, user profile data 120, and any other data as may serve a particular application. User profile data 120 may include any data associated with profiles and/or preferences of users (e.g., consumers and/or marketers) accessing system 100. User profile data 120 may be utilized to selectively provide one or more user interfaces and/or tools to users based on the user profile data 120 (e.g., by verifying permissions and/or user credentials before granting a user access to a user interface). User profile data 120 may be further utilized in conjunction with saving and maintaining records of search requests and/or search results as historical data associated with users.

Figure 2:
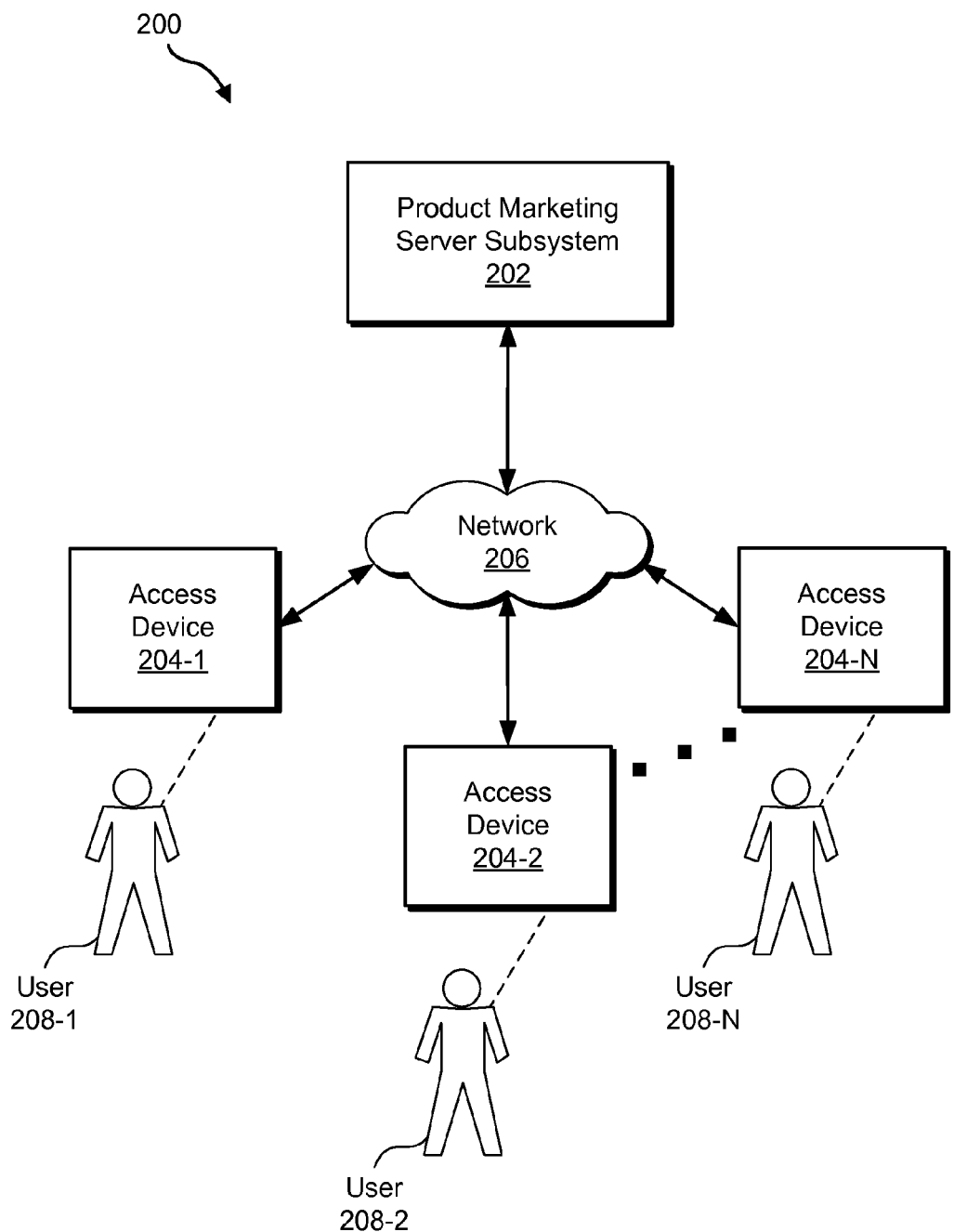
FIG. 2 illustrates an exemplary implementation of the system of FIG. 1 according to principles described herein.

FIG. 2 illustrates an exemplary implementation 200 of system 100. As shown in FIG. 2, implementation 200 may include a product marketing server subsystem 202 (or simply "product subsystem 202") selectively and communicatively coupled to a plurality of user access devices 204 (e.g., access devices 204-1 through 204-N).

Access devices 204 and product subsystem 202 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications networks and technologies.

In certain embodiments, access devices 204 and product subsystem 202 may communicate via a network 206, which may include one or more networks, including, but not limited to, wireless networks (Wi-Fi networks), (e.g., wireless communication networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, and any other networks capable of carrying data and/or communications signals between access devices 204 and product subsystem 202. Communications between product subsystem 202 and access devices 204 may be transported using any one of above-listed networks, or any combination or sub-combination of the above-listed networks. In certain exemplary embodiments, network 206 includes a mobile telephone network.

Access devices 204 may be associated with a plurality of users 208 (e.g., users 208-1 through 208-N), which in certain embodiments may be subscribers to or end users of one or more services (e.g., a wireless telephone service, a product search service, and/or a shopping assistant service) provided over network 206. A user 208 may include a consumer or a marketer. Product subsystem 202 may maintain user profile data 120 representative of user profiles for users of access devices 204 and utilize the user profiles to selectively provide product marketing, search, and/or shopping tools, as described herein.

An access device 204 may include any device configured to perform one or more of the access device operations described herein, including communicating with product subsystem 202 by way of network 206. Access device 204 may include, but is not limited to, a wireless computing device, a personal computer, a wireless communication device (e.g., a mobile telephone configured to access one or more services provided over network 206), a portable computing device (e.g., a laptop computer), a portable communication device, a personal digital assistant, a vehicular computing and/or communication device, a vehicle (e.g., an automobile), a portable navigation device, a Global Positioning System ("GPS") device, a personal media player device, a mobile computing device tethered to a personal computer or vice versa, a television, a set-top-box device, and/or any other access device configured to perform one or more of the access device operations described herein. In certain embodiments, access device 204 may include a camera and/or other image capture capabilities.

In certain embodiments, access devices 204 may be associated with heterogeneous communication platforms, and product subsystem 202 may be configured to communicate with each of the heterogeneous platforms. Accordingly, various types of access devices 204 associated with various communication platforms may be used by consumers to access one or more of the features and/or processes described herein.

Product subsystem 202 may include one or more computing devices (e.g., one or more server devices) implementing one or more components of system 100. In certain embodiments, system 100 may be implemented entirely by or within product subsystem 202. In other embodiments, components of system 100 may be distributed across product subsystem 202 and access devices 204. For example, an access device 204 may include a client (e.g., a client application) implementing one or more components (e.g., user interface facility 106) of system 100.

Figure 3:
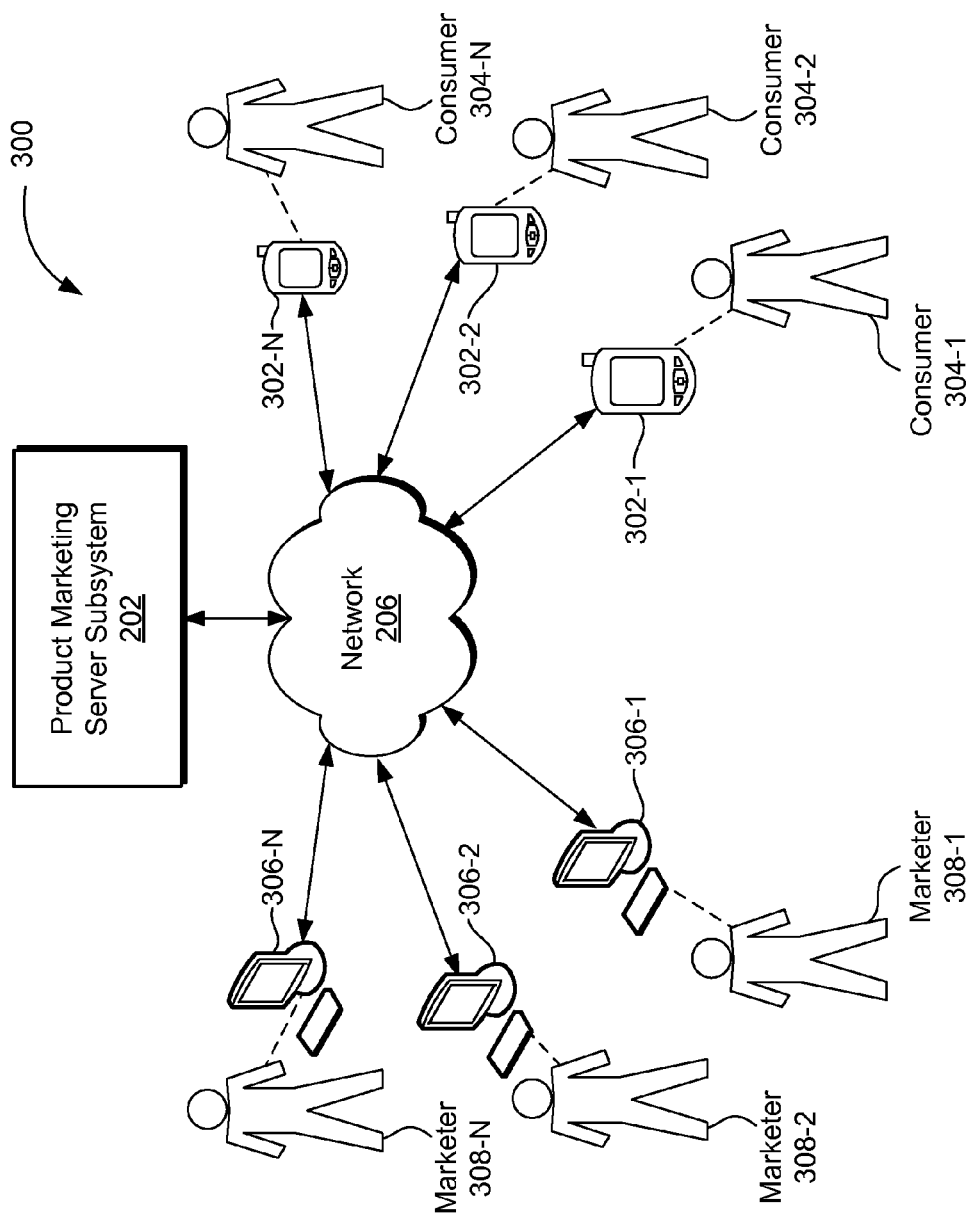
FIG. 3 illustrates another exemplary implementation of the system of FIG. 1 according to principles described herein.

FIG. 3 illustrates another exemplary implementation 300 of system 100. As shown in FIG. 3, implementation 300 may include product subsystem 202 in communication with a plurality of access devices 302 (e.g., access devices 302-1 through 302-N) in the form of mobile devices, such as mobile phones, associated with a plurality of consumers 304 (e.g., consumers 304-1 through 304-N) and with a plurality of access devices 306 (e.g., access devices 306-1 through 306-N) in the form of personal computers associated with a plurality of marketers 308 (e.g., marketers 308-1 through 308-N) via network 206.

In implementation 300, marketers 308 may utilize access devices 306 to provide (e.g., upload) product data representative of or otherwise associated with one or more products to product subsystem 202, which may store, aggregate, organize, and/or maintain the product data in a repository of product data as described above. Marketers 308 may also utilize access devices 306 to manage product data maintained in product subsystem 202. For example, a marketer 308 may modify (e.g., update) or delete the product data.

Consumers 304 may utilize access devices 302 to access product data maintained by product subsystem 202. Where access devices 302 comprise mobile devices such as mobile phones, many consumers 304 typically carry their access devices 302 wherever they go. An access device 302 being carried by a consumer 304 may provide improved conveniences and/or efficiencies for accessing product data from any location at which a mobile device has a connection with product subsystem 202. Accordingly, a consumer 304 may access one or more tools provided by system 100 from myriad locations and situations. For example, while at a social gathering, running an errand, or otherwise on the go, consumer 304-1 may notice a product in which consumer 304-1 is interested. Using access device 302-1, consumer 304-1 may capture a photograph image of the product and access one or more tools provided by system 100 to search for and access information about the product, based on the image of the product. System 100 may retrieve product information from the repository of product data 114 and/or product image data 116 maintained in data storage facility 112 and provide the retrieved information to access device 302-1 for presentation to consumer 304-1. Examples of graphical user interfaces ("GUIs") that may be displayed to a consumer and that are configured to facilitate access to and presentation of product information are described further below.

Several exemplary product marketing methods will now be described. While the methods are described in accordance with certain exemplary embodiments, other embodiments may omit, add to, reorder, combine, and/or modify any of the exemplary methods or steps in the exemplary methods. One or more of the exemplary methods or steps in the exemplary methods may be performed by system 100, one or more components of system 100, product subsystem 202, and/or access devices 204, 302, and/or 306.

Figure 4:
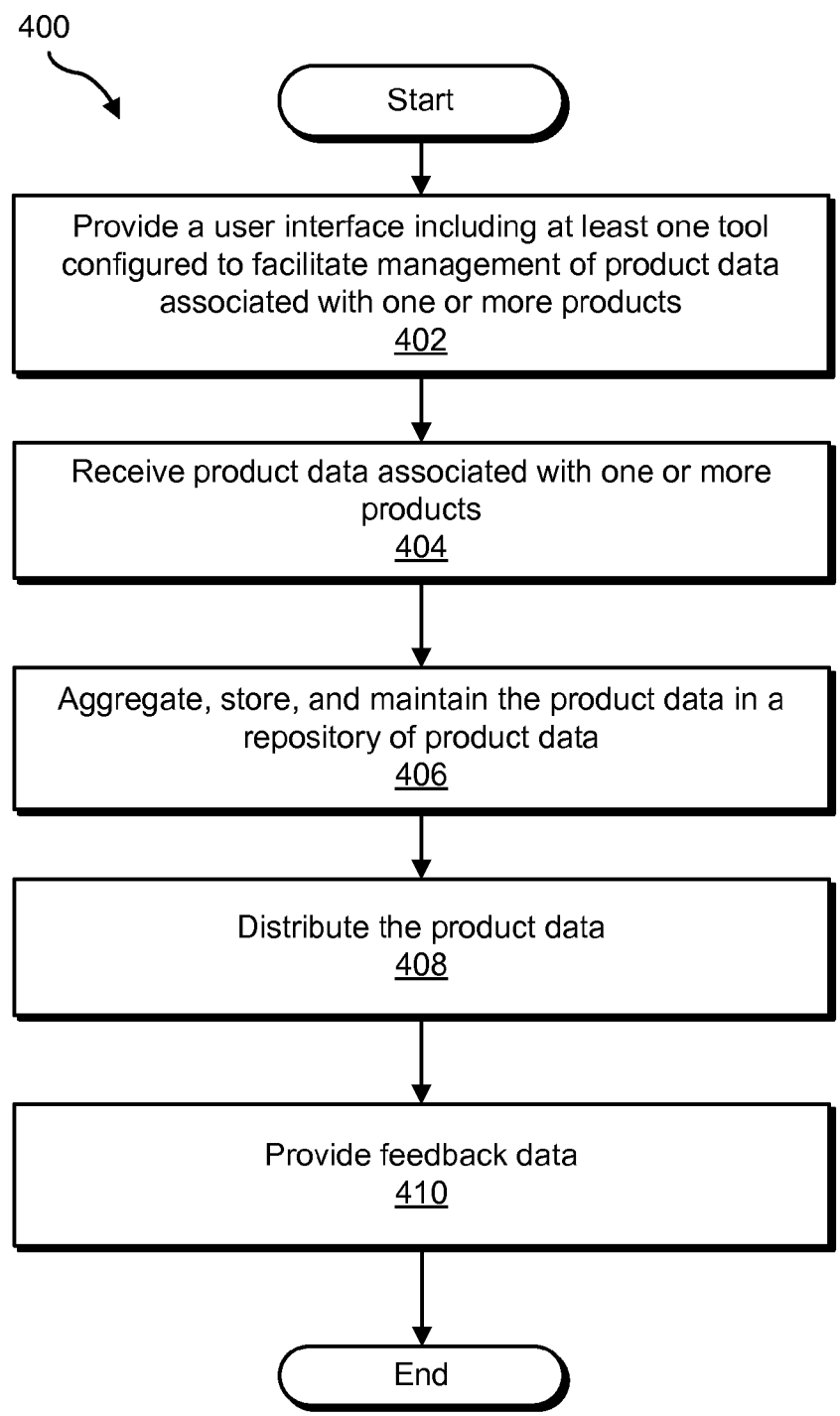
FIG. 4 illustrates an exemplary product marketing method according to principles described herein.

FIG. 4 illustrates an exemplary product marketing method 400. In step 402, a user interface including at least one tool configured to facilitate management of product data associated with one or more products is provided. For example, user interface facility 106 may provide a user interface, such as a GUI, having at least one tool configured to facilitate user management of product data. The user interface may be provided to a marketer. Accordingly, through the user interface, the marketer may upload, modify, delete, or otherwise manage product data. The user interface may also allow the marketer to define settings configured to control what, when, and/or how product data is presented to consumers.

In step 404, product data associated with one or more products is received. For example, user interface facility 106 may receive product data through the user interface provided in step 402. The product data may include product image data representative of one or more images associated with one or more products. For instance, a marketer may upload one or more images of a product, and user interface facility 106 may receive image data representative of the images through the user interface.

In step 406, the product data received in step 402 is aggregated, stored, and maintained in a repository of product data. For example, product data management facility 104 may receive product data from user interface facility 106 and aggregate, store, and maintain the product data in data storage facility 112.

In step 408, the product data is distributed. For example, system 100 may receive a product search request from an access device 204 or 302, search product data based on one or more parameters of the search request to identify one or more matches, generate search results data including the product data, and transmit the search results data to the access device 204 or 302 in response to the request.

In step 410, feedback data is provided to a marketer. For example, product data management facility 104 may generate feedback data descriptive of the distribution of the product data in step 408. The feedback data may be provided to the marketer (e.g., via an access device 204 or 306 associated with the marketer). The feedback data may include any information that may be helpful to the marketer. For example, the feedback data may include that a product represented in search results data provided in step 408 is unavailable. This information may help the marketer know when to make adjustments such as by providing more product inventory.

Figure 5:
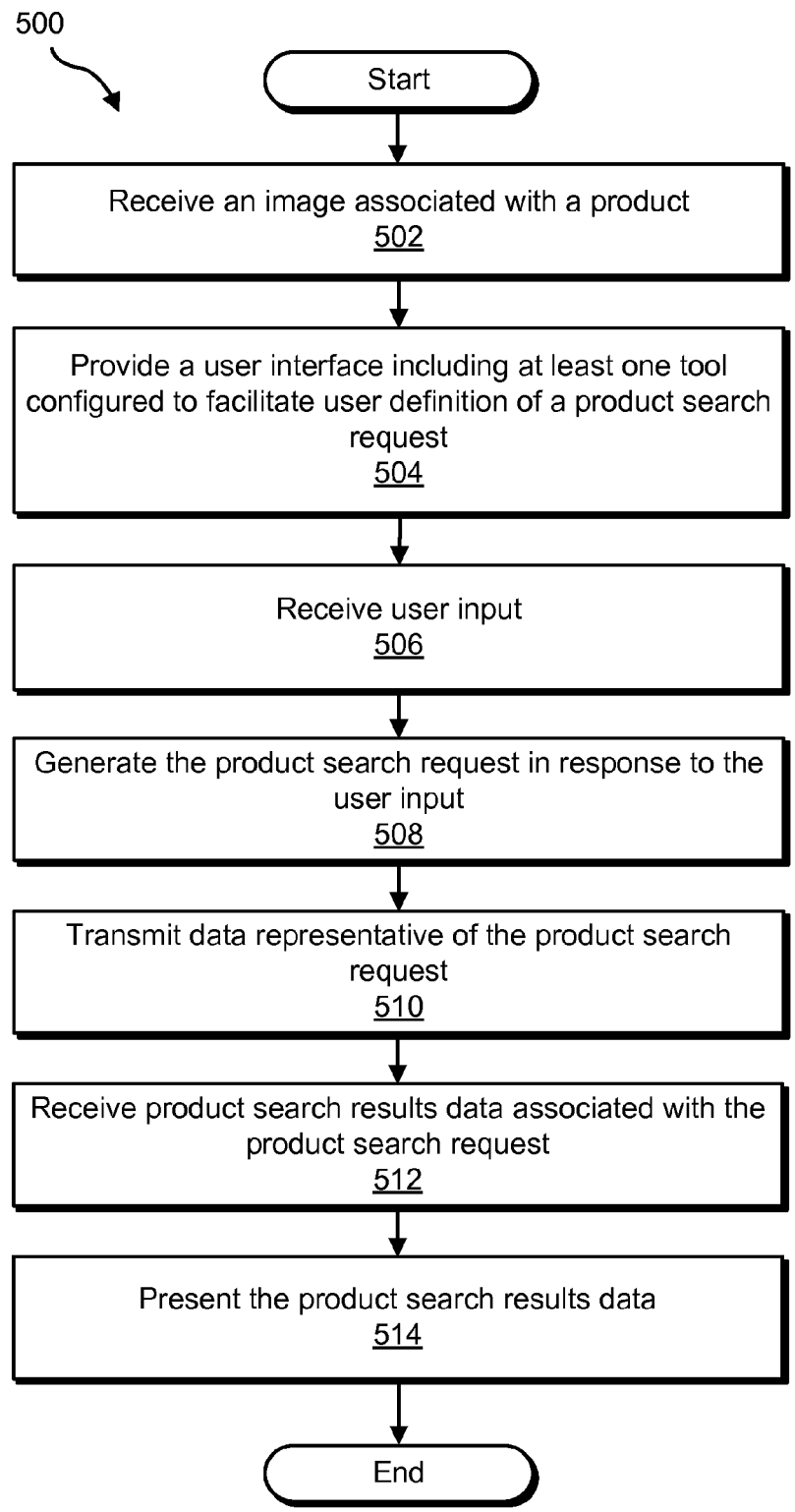
FIG. 5 illustrates another exemplary product marketing method according to principles described herein.

FIG. 5 illustrates another exemplary product marketing method 500. In step 502, an image associated with a product is received. For example, communication facility 102 of system 100 may receive image data representative of an image from an external source such as another computing device and/or an application executing on a computing device. The image data may be received in any suitable form and/or using any suitable communication technologies, including, without limitation, a media messaging service message and an e-mail message.

Figure 6:
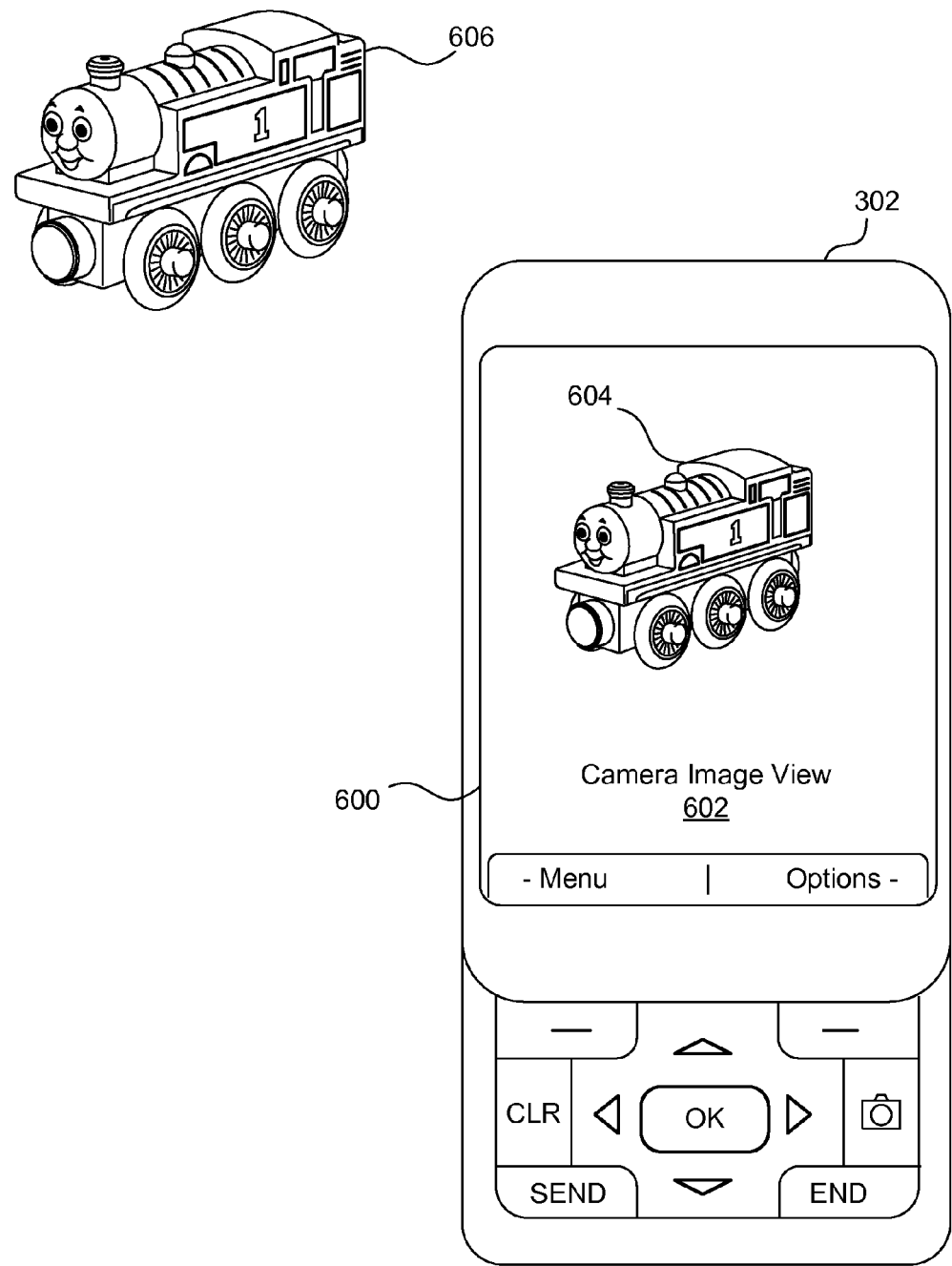
FIG. 6 illustrates an exemplary camera image view in a graphical user interface displayed by an access device according to principles described herein.

In certain embodiments, step 502 may include an access device 204 or 302 capturing an image of a product. For example, access device 204 or 302 may include a camera that captures the image of the product. A camera application executing on the access device 204 or 302 may provide data representative of the captured image to communication facility 102 of system 100. To illustrate, FIG. 6 shows an exemplary GUI 600 displayed by an access device 302. GUI 600 includes an exemplary camera image view 602 displaying data representative of a captured image 604 of a product 606 (e.g., an image of a toy train) as captured by the access device 302.

Returning to FIG. 5, in step 504, a user interface including at least one tool configured to facilitate user definition of a product search request is provided. For example, user interface facility 106 may provide a GUI including at least one tool configured to facilitate user definition of a product search request.

Figure 7:
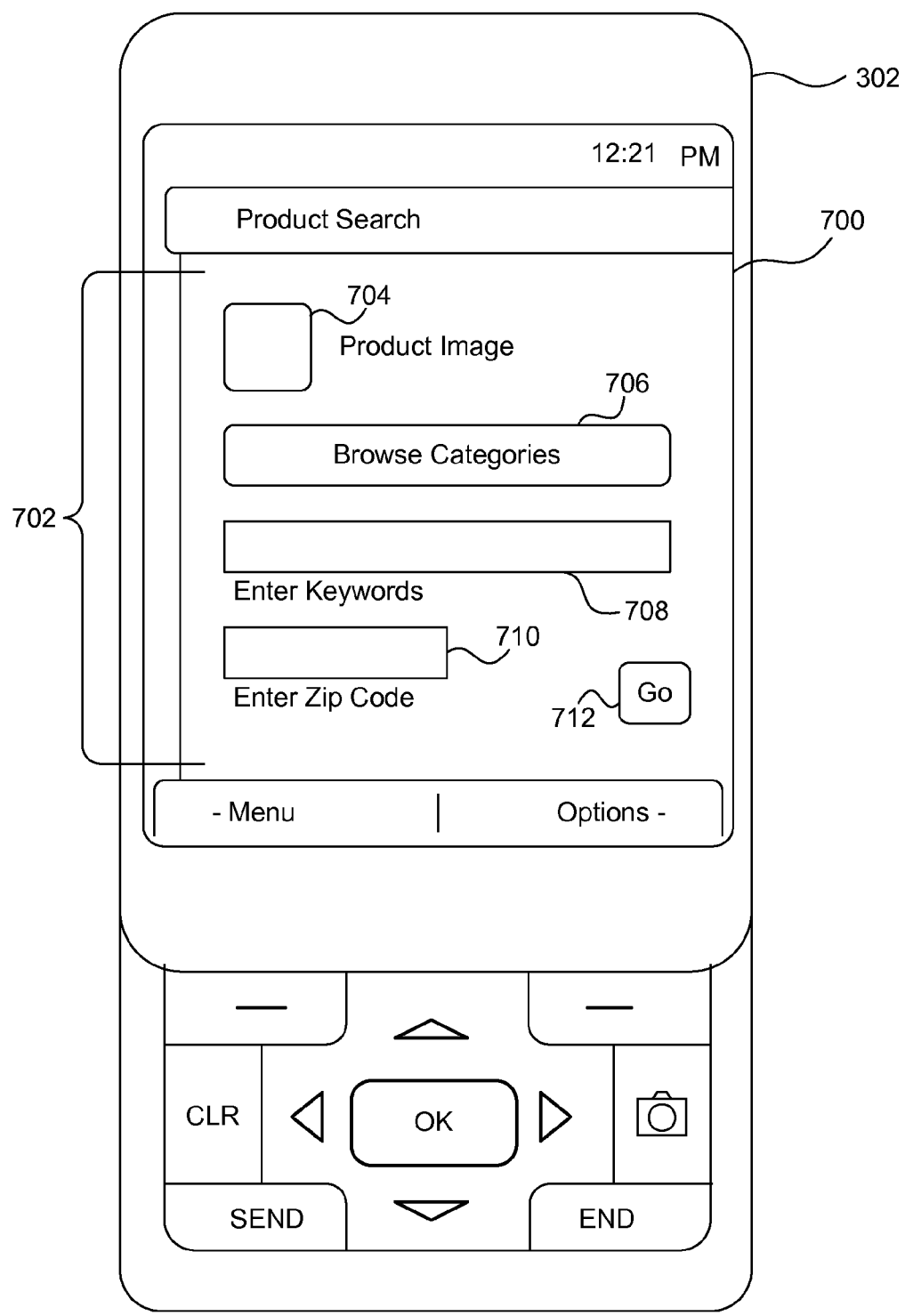
FIG. 7 illustrates an exemplary product search view in a graphical user interface displayed by an access device according to principles described herein.

To illustrate, FIG. 7 shows an exemplary GUI 700 displayed by an access device 302 and having a set of tools 702 configured to facilitate user definition of a product search request. The set of tools 702 may assist a consumer in specifying one or more search parameters for the product search request. In the illustrated example, the set of tools 702 includes an image parameter tool 704, a category parameter tool 706, a keyword parameter tool 708, and a location parameter tool 710.

Image parameter tool 704 may be configured to facilitate user selection of an image to be used as a search parameter of the product search request. Image parameter tool 704 may provide any suitable mechanism that may be utilized by a consumer to select an image that is stored or otherwise accessible by access device 302. For example, image parameter tool 704 may allow the consumer to search or browse one or more images that are stored or accessible by access device 302.

In FIG. 7, image parameter tool 704 includes a display of a thumbnail image representing an image that is currently selected to be used as a search parameter of the product search request. The image may be manually selected by a consumer as described above. Alternatively, the image may be automatically selected and associated with the image parameter tool 704 by system 100 in response to a predetermined event. For example, in response to the image being captured by the access device 302 in step 502, system 100 may automatically associate the captured image with the image parameter tool 704 such that the image may be used as a search parameter in a product search. In certain embodiments, in response to the image being captured by the access device 302 in step 502, system 100 may automatically launch and/or display GUI 700 as shown in FIG. 7.

Category parameter tool 706 may be configured to facilitate user selection of a product category to be used as a search parameter of the product search request. Accordingly, a consumer may search or browse product categories and select one of the product categories to be used as a search parameter of the product search request. Product categories may be defined by system 100 to include an aggregation of product categories specified in product data received from marketers. Additionally or alternatively, an operator of system 100 may define product categories. Examples of product categories may include, without limitation, apparel, accessories, fruits, flowers, greens, books, electronics, gifts, grocery, health, beauty, jewelry, sports, fitness, games, toys, cameras, camcorders, computers, televisions, video equipment, gifts, phones, office, software, hardware, furniture, and any other category or categories of products.

Keyword parameter tool 708 may be configured to facilitate user selection and/or entry of one or more keywords to be used as search parameters of the product search request. Accordingly, a consumer may search, browse, or enter one or more keywords to be used as search parameters of the product search request.

Location parameter tool 710 may be configured to facilitate user selection or entry of a location identifier (e.g., a zip code) to be used as a search parameter of the product search request. Accordingly, a consumer may select or enter a location to be used as a search parameter of the product search request. In certain embodiments, system 100 may be configured to automatically populate location parameter tool 710 with a location identifier associated with the consumer and/or access device 302. For example, the access device 302 may be equipped with Global Positioning System or other location detecting capabilities, and system 100 may populate location parameter tool 710 based on the current geographic location of the access device 302.

Using the set of tools 702, a consumer may specify one or more search parameters to be used in a product search. After the consumer has specified the search parameters, which may be any combination or sub-combination of the image, category, keyword, and location parameters described above, the consumer may submit the search parameters to system 100 by selecting a "Go" button 712 displayed in GUI 700.

Returning to FIG. 5, in step 506, user input may be received. The user input may be configured to initiate the product search request. For example, user interface facility 106 of system 100 may receive the user input in response to the consumer selecting the "Go" button 712 shown in FIG. 7. The user input may specify one or more search parameters, including one or more search parameters specified by the consumer using the set of tools 702 in GUI 700.

In step 508, the product search request is generated in response to the user input received in step 506. For example, search facility 108 of system 100 may generate data representative of the product search request in response to the user input. The product search request may specify one or more search parameters to be used to search product data.

In step 510, data representative of the product search request is transmitted. For example, access device 204 or 302 may transmit data representative of the product search request to product subsystem 202 for use in searching the repository of product data 114 and/or product image data 116 in data storage facility 112 to identify one or more matches to the one or more search parameters specified in the product search request. Product subsystem 202 may receive the product search request and perform the search in any of the ways described herein.

In step 512, product search results data associated with the product search request is received. For example, the access device 204 or 302 may receive the product search results data from product subsystem 202. The product search results data may be generated by the product subsystem 202 in any of the ways described herein.

Figure 8:
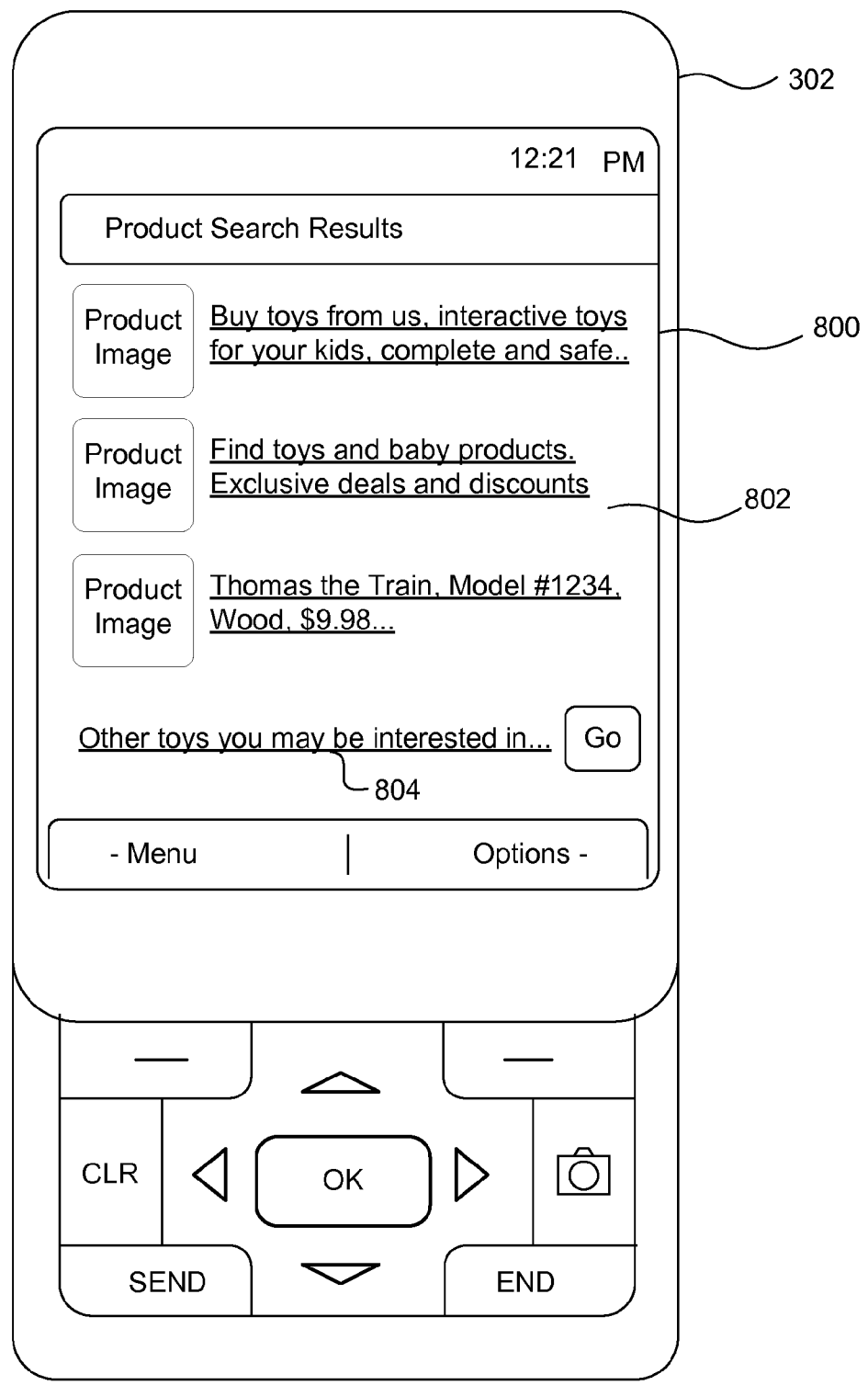
FIG. 8 illustrates an exemplary search results view in a graphical user interface displayed by an access device according to principles described herein.

In step 514, the product search results data may be presented. For example, the access device 204 or 302 may display the product search results data for consideration by the consumer. To illustrate, FIG. 8 shows an exemplary GUI 800 displayed by an access device 302 and including a search results view 802 having the product search results data displayed therein. As shown, the product search results data displayed in search results view 802 may include product information related to one or more products that have been identified as matches to the search parameters of the product search request. In the illustrated example, the product search results data includes a list of entries providing information about the matching products, including product images, vendor information, promotional descriptions, product descriptions, product prices, and hyperlinks to additional information about the products, vendor websites, and/or product purchase interfaces. Other product information may be presented in other examples.

In some examples, system 100 may be configured to identify related products in which the consumer may be interested and provide a way for the consumer to access information about the related products. In FIG. 8, for example, a hyperlink 804 may be displayed notifying the consumer that information about related products is available.

Figure 9:
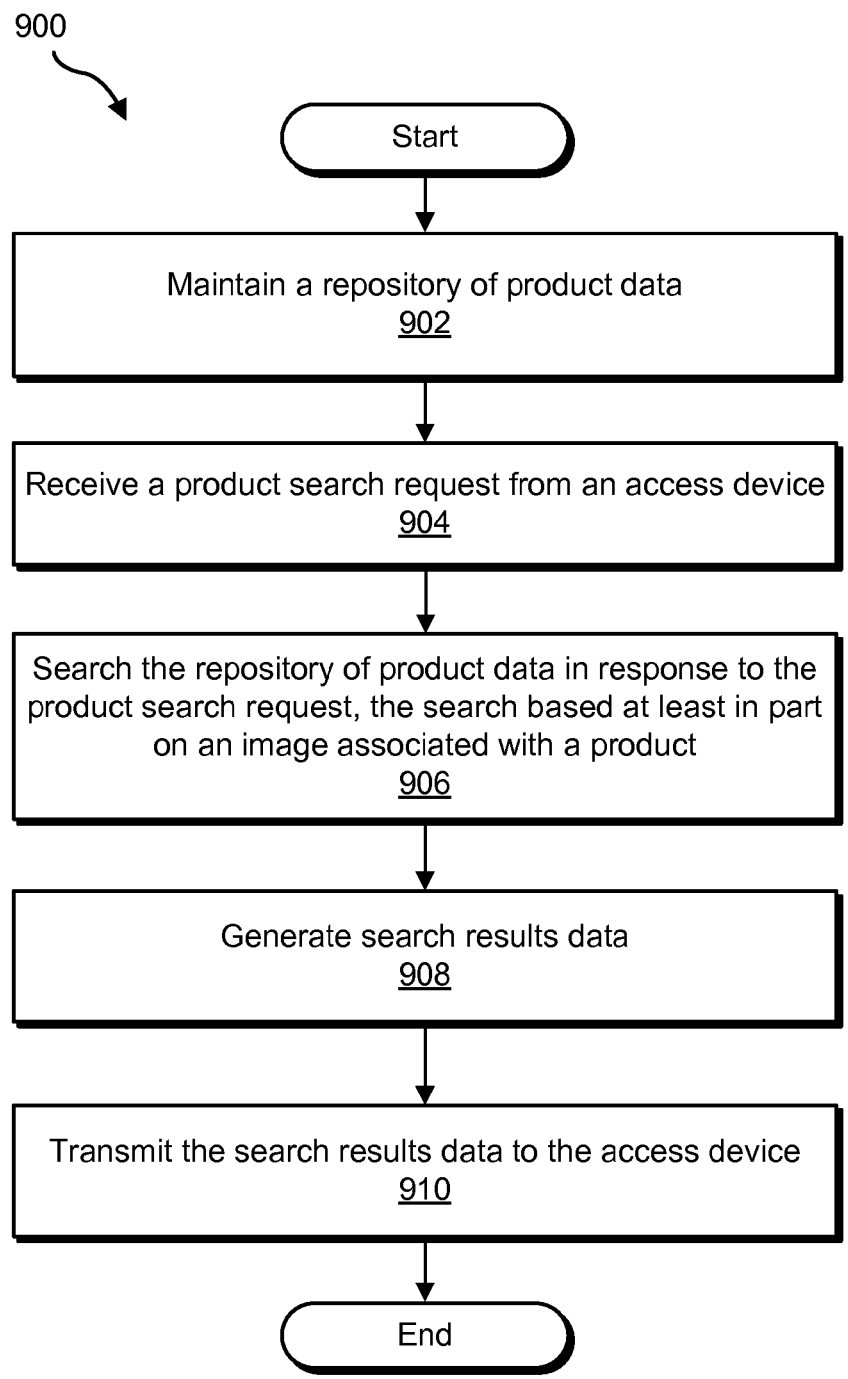
FIG. 9 illustrates another exemplary product marketing method according to principles described herein.

FIG. 9 illustrates another exemplary product marketing method 900. In step 902, a repository of product data is maintained. Step 902 may be performed in any of the ways described above. For example, product data management facility 104 may maintain a repository of product data 114 in data storage facility 112. In certain embodiments, the repository of product data may include or be associated with a repository of product image data 116.

In step 904, a product search request is received from an access device 204 or 302. For example, the product search request may be received by communication facility 102 of system 100 and/or by product subsystem 202. As described herein, the product search request may specify one or more search parameters to be used in a product search. The product search parameters may include or be associated with image data representative of an image to be used to search a repository of product image data 116. In addition to an image search parameter, the search request may specify one or more other parameters to be used in a product search, including category, keyword, and/or location parameters, as described above.

In step 906, the repository of product data is searched in response to the search request. Step 906 may include searching a repository of product image data 116, based on an image parameter specified by the search request and indicating an image associated with a product, to identify at least one match to the image. To illustrate, the product search request may include or be associated with image data representative of an image of a product. In step 906, search facility 108 may search a repository of product image data 116 using the image data to identify at least one match to the image of the product.

In some examples, a combination of search parameters may be used to search a repository of product data in step 906. For example, in addition to using image data to search product image data 116 for one or more matches to an image, product category, keyword, and/or location parameters may be used to search product data. As an example, a keyword-based search, a category-based search, and/or a location-based search may be performed in addition to an image-based search. For instance, if an image-based search does not produce any results, another search of product data may be performed based on category, keyword, and/or location parameters. Alternatively, a preliminary search of product data may be performed based on category, keyword, and/or location parameters to identify a subset of the products represented by the product data, and a search of the identified subset of product data may be performed based on image data. This may help conserve resources by first narrowing the product data to be searched based on image data.

In step 908, search results data is generated. For example, search facility 108 may generate the search results data based on the match or matches identified in step 906. The search results data may be generated by determining at least one product from the match or matches identified in step 906 and retrieving product information for the product or products from the repository of product data in data storage facility 112 and/or from one or more external sources. The retrieval of production information may be performed in accordance with one or more settings provided by marketers who provided the product data for the products.

In step 910, the search results data is transmitted to the access device 204 or 302 from which the product search request was received in step 904. For example, communication facility 102 and/or product subsystem 202 may transmit the search results data to the access device from which the product search request was received in step 904.

A consumer associated with an access device 204 or 302 may search product data and be presented with search results data for the search as described above. The consumer may utilize the search results data for one or more shopping decisions and/or operations. For example, the consumer may further investigate a product listed in the search results data and/or may complete a transaction to purchase a product listed in the search results data. System 100 may provide one or more tools associated with purchase of a product, including automatically providing alerts specifying statuses of product orders.

In certain embodiments, system 100 may be configured to log one or more operations and/or events associated with a transaction (e.g., a purchase of a product). Such log data may be stored and used to ascertain consumption patterns for consumers, products, types of products, geographic regions, etc. Additionally or alternatively, system 100 may be configured to log and maintain historical data representative of product search requests initiated by consumers (e.g., keywords used by consumers), search results data generated in response to the requests, and transaction histories of consumers. System 100 may make such historical data accessible to consumers for reuse.

An operator of system 100 may configure system 100 such that revenue may be collected for one or more of the services provided by system 100. For example, a percentage point on each transaction carried out using the systems and methods described herein, or a different amount, may be billed by the operator. As another example, marketers may be billed for having product data in data storage facility 112. These examples of collecting revenue are illustrative only. Other ways of collecting revenue may be used in other examples.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a computer-readable medium, or combinations of tangibly embodied computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 10:
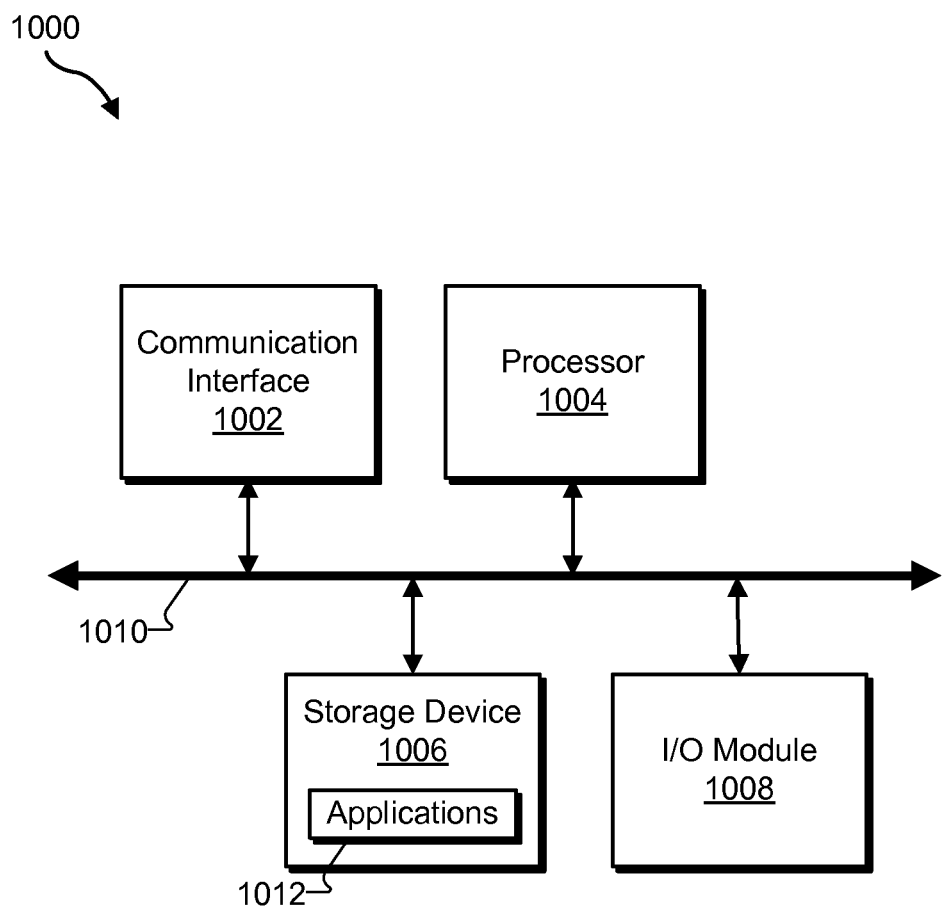
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. Communication interface 1002 may additionally or alternatively provide such a connection through, for example, a local area network (such as an Ethernet network), a personal area network, a telephone or cable network, a satellite data connection, a dedicated URL, or any other suitable connection. Communication interface 1002 may be configured to interface with any suitable communication media, protocols, and formats, including any of those mentioned above.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more software applications) configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and/or output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with communication facility 102, product data management facility 104, user interface facility 106, search facility 108, and/or image matching facility 110. Likewise, storage facility 112 may be implemented by or within storage device 1006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
automatically providing, by a product marketing system for display on an access device in response to an image associated with a product being captured by the access device, a graphical user interface including a set of tools configured to facilitate a user definition of a product search request, the set of tools including at least one of a keyword parameter tool and a category parameter tool;
receiving, by the product marketing system by way of the graphical user interface, the user definition of the product search request, the product search request including at least one of a keyword search parameter and a category search parameter;
searching, by the product marketing system, a repository of product data associated with one or more products to identify at least one match to the image associated with the product and the product search request, the product data including product image data representative of one or more images associated with the one or more products;

generating, by the product marketing system and based on the at least one match, search results data comprising product information for at least one product; and providing, by the product marketing system, the search results data for presentation to a user of the access device.

2. The method of claim 1, further comprising:
maintaining, by the product marketing system, the repository of product data.

3. The method of claim 2, further comprising:
receiving, by the product marketing system from one or more marketers, the product data including the product image data.

4. The method of claim 3, further comprising:
providing, by the product marketing system, a marketer interface for access by the one or more marketers;
wherein the product data including the product image data is received from the one or more marketers by way of the marketer interface.

5. The method of claim 3, further comprising:
providing, by the product marketing system, feedback data to the one or more marketers, wherein the feedback data is descriptive of a distribution of the product data.

6. The method of claim 5, wherein the feedback data is descriptive of the transmitting of the search results data to the access device.

7. The method of claim 1, wherein the generating comprises:
determining the at least one product from the at least one match; and
retrieving the product information for the at least one product from the repository of product data associated with the one or more products.

8. The method of claim 1,
wherein the searching of the repository of product data associated with the one or more products to identify the at least one match to the image associated with the product and the product search request includes:
searching, by the product marketing system, the repository of product data using the at least one of the keyword search parameter and the category search parameter to identify a subset of the one or more products matching the at least one of the keyword search parameter and the category search parameter; and
searching, by the product marketing system, a subset of the product image data that is associated with the subset of the one or more products matching the at least one of the keyword search parameter and the category search parameter to identify at least one match to the image associated with the product.

9. The method of claim 1, wherein the user of the access device is a subscriber to a service provided by the product marketing system.

10. The method of claim 1, wherein at least a portion of the product image data represents a three-dimensional view of each product included in the one or more products.

11. The method of claim 1, wherein the product image data includes a plurality of images representing a plurality of different views of each product included in the one or more products.

12. The method of claim 1, wherein the searching comprises:
analyzing the image data representative of the image associated with the product as compared to the product image data; and determining, based on the analysis, whether the product image data includes the at least one match to the image associated with the product.

13. The method of claim 1, wherein:
the access device comprises a mobile phone device having a camera; and
the image associated with the product comprises a photograph of the product captured by the camera of the mobile phone device.

14. A method comprising:
automatically displaying, by an access device in response to an image associated with a product being captured by the access device, a graphical user interface including at least one of a keyword parameter tool and a category parameter tool configured to facilitate definition of a product search request by a user of the access device;
receiving, by the access device, the definition of the product search request from the user via the graphical user interface, wherein the product search request includes at least one of a keyword and a product category;
transmitting, by the access device, data representative of the product search request and image data representative of the image associated with the product to a product marketing server subsystem for use by the product marketing server subsystem in searching a repository of product data to identify at least one match to the image associated with the product and the at least one of the keyword and the product category;
receiving, by the access device, product search results data from the product marketing server subsystem, the product search results data including product information for at least one product associated with the at least one match to the image associated with the product and the at least one of the keyword and the product category; and
presenting, by the access device, the product search results data for consideration by the user of the access device.

15. The method of claim 14, wherein the keyword is received by way of the keyword parameter tool and the product category is received by way of the category parameter tool.

16. The method of claim 14, further comprising:
receiving, by the product marketing server subsystem from the access device, the data representative of the product search request and the image data representative of the image associated with the product;
searching, by the product marketing server subsystem and in response to the receipt of the data representative of the product search request and the image data representative of the image associated with the product, product image data in the repository of product data to identify the at least one match to the image associated with the product and the at least one of the keyword and the product category;
generating, by the product marketing server subsystem and based on the at least one match, the product search results data comprising the product information for the at least one product; and
transmitting, by the product marketing server subsystem, the product search results data to the access device.

17. A system comprising:
a user interface facility configured to automatically provide, for display on a user access device in response to an image associated with a product being captured by the user access device, a graphical user interface including a set of tools configured to facilitate a user definition of a product search request, the set of tools including at least one of a keyword parameter tool and a category parameter tool; and a search facility configured to receive, by way of the graphical user interface, the user definition of the product search request, the product search request including at least one of a keyword search parameter specifying a keyword and a category search parameter specifying a product category;

search a repository of product data associated with one or more products to identify at least one match to the image associated with the product and the product search request, the product data including product image data representative of one or more images associated with the one or more products, and generate, based on the at least one match, search results data comprising product information for at least one of the one or more products represented by the product data.

18. The system of claim 17, wherein the search facility is configured to generate the search results data by determining the at least one of the one or more products from the at least one match; and retrieving the product information for the at least one of the one or more products from the repository of product data associated with the one or more products.

19. The system of claim 17, wherein the search facility is configured to search the product image data by comparing the image associated with the product to the product image data; and determining, based on the comparing, whether the product image data includes the at least one match to the image associated with the product.

* * * * *